(12) United States Patent
Schwindt et al.

(10) Patent No.: US 11,454,525 B2
(45) Date of Patent: Sep. 27, 2022

(54) VEHICLE SENSOR FIELD CALIBRATION UTILIZING OTHER VEHICLES

(71) Applicant: Robert Bosch GmbH, Stuttgart (DE)

(72) Inventors: Oliver Schwindt, Sunnyvale, CA (US); Andreas Heyl, Sunnyvale, CA (US); Thomas Gussner, Ludwigsburg (DE); Theresa Kienle, Neugereut (DE); Joachim Mueller, Boeblingen (DE); Stephan Reuter, Thalfingen (DE)

(73) Assignee: Robert Bosch GmbH, Stuttgart (DE)

( * ) Notice: Subject to any disclaimer, the term of this patent is extended or adjusted under 35 U.S.C. 154(b) by 602 days.

(21) Appl. No.: 16/165,075

(22) Filed: Oct. 19, 2018

(65) Prior Publication Data

US 2020/0124447 A1    Apr. 23, 2020

(51) Int. Cl.
*G01D 18/00* (2006.01)
*G05D 1/02* (2020.01)

(52) U.S. Cl.
CPC ............ *G01D 18/006* (2013.01); *G05D 1/021* (2013.01)

(58) Field of Classification Search
CPC ............... G01D 18/006; G05D 1/021
See application file for complete search history.

(56) References Cited

U.S. PATENT DOCUMENTS

| | | | |
|---|---|---|---|
| 8,849,926 B2 | 9/2014 | Marzencki et al. | |
| 10,832,502 B2 * | 11/2020 | Levinson | G06Q 10/06 |
| 2012/0173185 A1 * | 7/2012 | Taylor | G01S 7/4004 |
| | | | 702/104 |
| 2015/0224997 A1 * | 8/2015 | Glugla | F02D 41/2441 |
| | | | 701/54 |
| 2016/0009280 A1 * | 1/2016 | Tokimasa | G01S 13/931 |
| | | | 701/96 |
| 2018/0144156 A1 | 5/2018 | Surnilla et al. | |
| 2018/0190046 A1 * | 7/2018 | Levinson | G06Q 10/08 |
| 2018/0373260 A1 * | 12/2018 | Lipson | G05D 1/024 |

FOREIGN PATENT DOCUMENTS

| | | |
|---|---|---|
| EP | 2950290 | 2/2015 |
| WO | 2017189361 | 11/2017 |
| WO | 2018091685 | 5/2018 |

* cited by examiner

*Primary Examiner* — Alexander Satanovsky
(74) *Attorney, Agent, or Firm* — David Kovacek; Maginot, Moore & Beck LLP (57) ABSTRACT

A system and method for determining if a field calibration of a subject sensor associated with a vehicle is warranted, and calibrating the subject sensor using a sensor associated with another vehicle when calibration is warranted. Reference vehicles may perform predetermined maneuvers in order to provide additional measurements for use during calibration.

8 Claims, 5 Drawing Sheets

VEHICLE SENSOR FIELD CALIBRATION UTILIZING OTHER VEHICLES

TECHNICAL FIELD

This disclosure relates to the calibration of vehicular sensors useful for driver assistance systems or autonomous driving modes of the associated vehicle.

BACKGROUND

Driver assistance systems in vehicles may be capable of providing assistance to drivers by performing driving functions associated with driving or maneuvering the vehicle. Driver assistance functions may comprise particular maneuvers such as parallel parking or braking assistance. Some driver assistance functions may comprise autonomous vehicle operations, also referred to as self-driving. Self-driving vehicles and vehicles with other driver assistance functions need environmental perceiving sensors, such as radar, lidar, cameras, or ultrasound sensors. Other sensors may be useful in determining functions of the vehicle, such as steering angle sensors, wheel speed sensors, or yawrate sensors. All of these sensors require calibration for accurate operation.

Calibration of sensors may occur in a controlled environment, such as an assembly plant or specialized workshops. However, over time most sensors are specified to be calibrated in order to accommodate for gradual misalignment during normal operation or other causes of misalignment. Bringing the associated vehicle to a specialized facility for sensor recalibration may be inconvenient, costly, or time-consuming.

SUMMARY

One aspect of this disclosure is directed to a system for online calibration of vehicle sensors comprising a processor, a subject sensor for calibration, and a plurality of location sensors operable to provide reference measurements for the sensor calibration. The subject sensor may be associated with a vehicle, and the location sensors may be associated with vehicles. The calibration may be coordinated by a processor in data communication with the subject sensor and the locations sensors. In some embodiments, one or more of the vehicles associated with a location sensor may be operable to perform a predetermined maneuver to provide multiple reference measurements for calibration.

Another aspect of this disclosure is directed to a system comprising a first vehicle processor in data communication with a subject sensor. The first vehicle processor is operable to communicate with at least one other vehicle processor associated with a vehicle other than the first vehicle. Each of the other vehicles having a vehicle processor may comprise a location sensor to be utilized to provide references measurements during calibration of the subject sensor.

A further aspect of this disclosure is directed to a method of calibrating a subject sensor associated with a vehicle utilizing one or location sensors indicating the locations of the subject sensor and one or more other vehicles not associated with the subject sensor to extrapolate expected measurements of the subject sensor during calibration. In some embodiments, one or more of the vehicles associated with a reference sensor may be directed to perform a predetermined maneuver during the calibration of the subject sensor.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
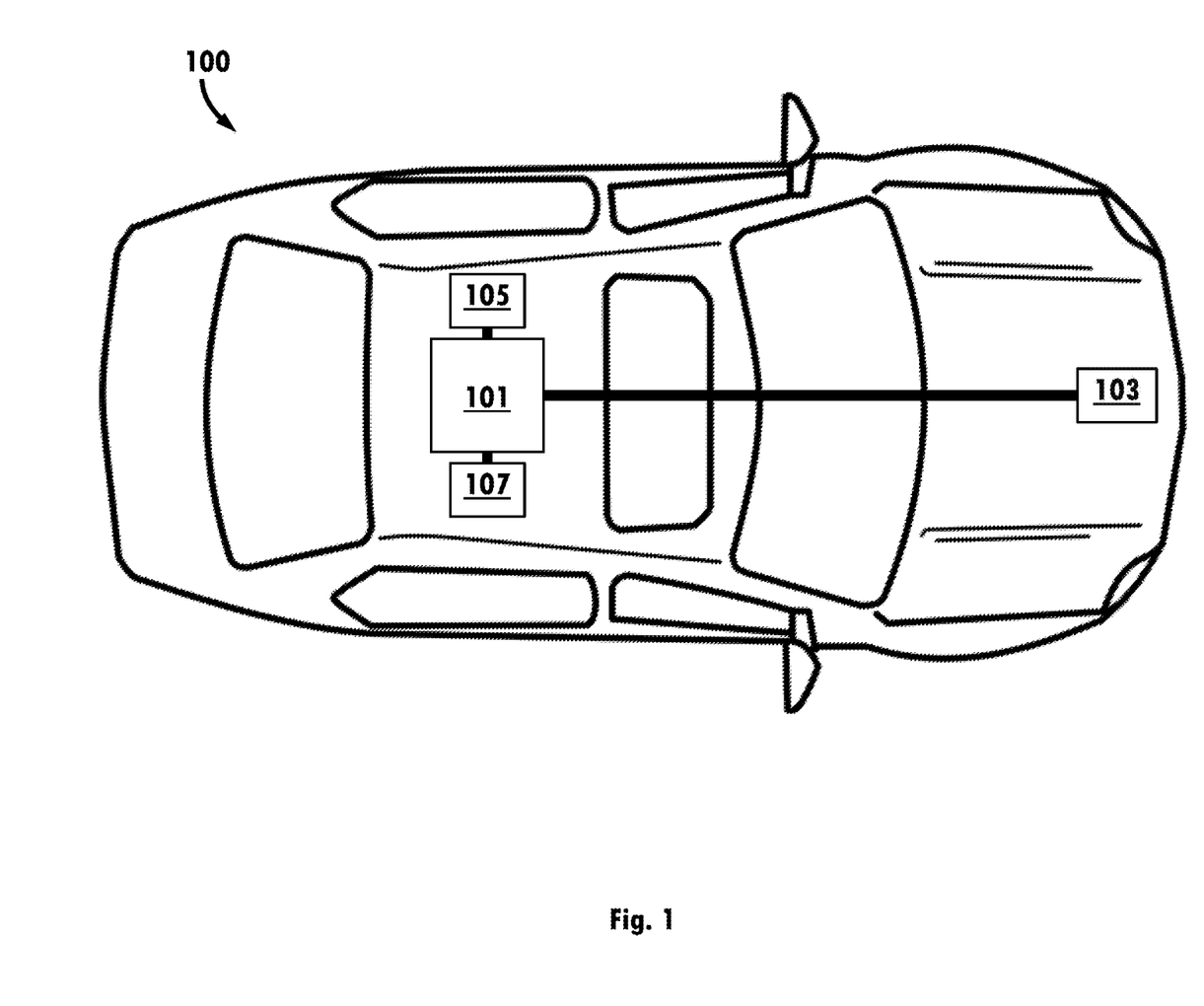
FIG. 1 is a diagrammatic view of a vehicle comprising a sensor having field calibration functions.

FIG. 1 is a diagrammatic illustration of a vehicle 100 having a vehicle processor 101 operable to interact with components and systems of the vehicle. Vehicle processor 101 may be in data communication with a field-adjustable sensor 103. Functions of vehicle processor 101 may comprise the ability to gather measurement data from field-adjustable sensor 103, and adjust the calibration settings of field-adjustable sensor 103. In the depicted embodiment, field-adjustable sensor 103 may comprise a forward-facing proximity sensor, but other embodiments may comprise other configurations or sensor types without deviating from the teachings disclosed herein. In some embodiments, field-adjustable sensor 103 may comprise a radar sensor, lidar sensor, external temperature sensor, proximity sensor, ultrasonic sensor, microphone, camera, optical sensor, infrared sensor, accelerometer, yawrate sensor, wheel speed sensor, speedometer, a steering angle sensor, or any other sensor known to one of ordinary skill in the art that may be activated and verified during normal operation of vehicle 100.

In the depicted embodiment, vehicle 100 comprises one field-adjustable sensor 103, but other embodiments may comprise multiple field-adjustable sensors 103 without deviating from the teachings disclosed herein. In such multi-sensor embodiments, the plurality of field-adjustable sensors 103 may comprise sensors of different types without deviating from the teachings disclosed herein. By way of example and not limitation, a vehicle 100 may comprise a number of field-adjustable sensors 103 comprising a wheel speed sensor, yawrate sensor, steering angle sensor, forward-facing motion sensor, and rear-facing proximity sensor. In some embodiments, multiple field-adjustable sensors 103 may comprise redundant or partially-redundant sensors without deviating from the teachings disclosed herein. By way of example and not limitation, a vehicle 100 may comprise an array of rear-facing proximity sensors and a backup camera operable to assist a driver in avoiding collisions when backing up. Other embodiments may comprise alternative configurations of field-adjustable sensors 103, all receptive to calibration by vehicle processor 101 without deviating from the teachings disclosed herein.

Vehicle 100 may also comprise a location sensor 105 in data communication with vehicle processor 101. Location sensor 105 may be operable to provide location data to the vehicle processor indicating a location of the vehicle 100 with respect to the surrounding environment. Because the dimensions of vehicle 100 are known, including the relative position of field-adjustable sensor 103 with respect to location sensor 105, the location of field-adjustable sensor 103 may also be known. In the depicted embodiment, the location data may comprise global navigation satellite system (GNSS) coordinate data, but other embodiments may comprise other configurations without deviating from the teachings disclosed herein. In some embodiments, vehicle 100 may comprise a plurality of location sensors 105 without deviating from the teachings disclosed herein. In such embodiments, individual locations sensors 105 may utilize distinct configurations without deviating from the teachings disclosed herein. In some embodiments, a system of location sensors 105 may utilize other data, such as densely-populated map data and additional environmental sensor data, to provide a more-detailed measurement of location without deviating from the teachings disclosed herein.

Vehicle processor 101 may be operable to access data describing the physical dimensions of vehicle 100 and the placement of field-adjustable sensor 103, and location sensor 105 within the dimensions of vehicle 100. Because vehicle processor 101 has access to such data, vehicle processor 101 is able to calculate the position of field-adjustable sensor 103 based upon data generated by location sensor 105. Similarly, vehicle processor 101 may utilize the data describing the physical dimensions of vehicle 100 to generate data describing the boundaries of the chassis. Thus, vehicle 101 may be operable to generate data describing the position of the exterior portions of vehicle 100.

Vehicle 100 may also comprise a wireless transceiver 107 in data communication with vehicle processor 101. Wireless transceiver 107 may be operable to enable data communication with other processors external to vehicle 100. In the depicted embodiment, wireless transceiver 107 is depicted as a single unit operable to both send and receive data communications, but other embodiments may comprise alternative configurations such as a distinct transmitter and receiver without deviating from the teachings disclosed herein. Wireless transceiver 107 may utilize a Wi-Fi protocol, Zigby protocol, cellular data protocol, satellite transmission protocol, or any other wireless data communication implementation known to one of ordinary skill in the art without deviating from the teachings disclosed herein.

In the depicted embodiment, vehicle 100 may be an autonomous vehicle operable to perform functions pertaining to autonomous driving, but other embodiments may comprise other configurations without deviating from the teachings disclosed herein. Other embodiments may comprise a partially-autonomous functions without deviating from the teachings disclosed herein. Other embodiments may comprise advanced driver-assistance system (ADAS) functions without deviating from the teachings disclosed herein. Other embodiments may comprise only non-autonomous functions that rely upon sensors without deviating from the teachings disclosed herein. In some embodiments, vehicle 100 may be selectively operable to perform in an autonomous mode or a non-autonomous mode without deviating from the teachings disclosed herein.

In the depicted embodiment, vehicle 100 may comprise a sedan, but other embodiments may comprise other types of vehicle without deviating from the teachings disclosed herein. By way of example, and not limitation, vehicle 100 may comprise a van, light truck, multi-axel truck, minivan, motorcycle, motor scooter, sport utility vehicle, crossover vehicle, side-by-side vehicle, off-road vehicle, or any other vehicle comprising a field-adjustable sensor without deviating from the teachings disclosed herein.

Figure 2:
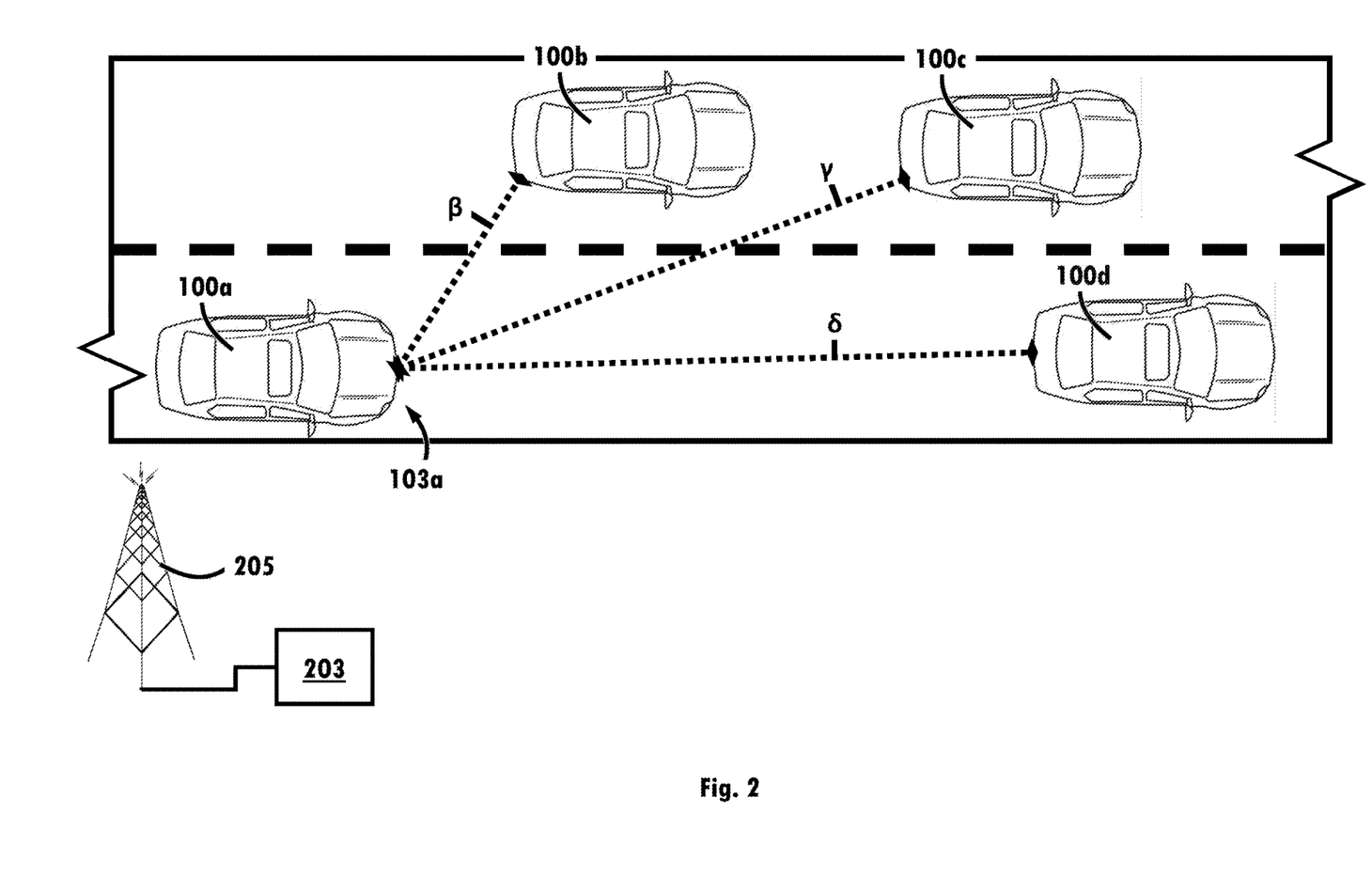
FIG. 2 is a diagrammatic view of a first system operable to perform a field calibration of a vehicle sensor.

FIG. 2 is a diagrammatic view of a system operable for field calibration of a vehicle sensor according to one embodiment of the teachings disclosed herein. In the depicted embodiment, vehicles 100a, 100b, 100c, and 1004 may comprise the configurations of vehicle 100 (see FIG. 1), but other embodiments may comprise other configurations without deviating from the teachings disclosed herein. In the depicted embodiment, each of vehicles 100a, 1001a, 100c, and 1004 may be functionally identical, but other embodiments may comprise other configurations without deviating from the teachings disclosed herein. In the depicted embodiment, vehicle 100a serves as the subject vehicle, but any other vehicle 100 within the system may serve as a subject vehicle for a field calibration of an associated sensor without deviating from the teachings disclosed herein.

In the depicted embodiment, vehicle 100a serves as a subject vehicle during calibration of field-adjustable sensor 103a, and field-adjustable sensor 103a serves as a subject sensor in the calibration. A vehicle processor 101a (not shown; see FIG. 1) of vehicle 100a is operable to detect a conditions of vehicle 100 that may warrant a calibration of field-adjustable sensor 103a. Conditions that warrant a calibration of a sensor may comprise routine maintenance-related conditions, such as a predetermined mileage of travel, a predetermined amount of time since a previous calibration, or a request by a user or technician to vehicle processor 100a to perform a calibration.

Other conditions that warrant a calibration may be incidental conditions, such as an unexpected impact or collision, a repair to vehicle 100a known to affect sensor operation, detection of suboptimal sensor performance, detection of an undesirable driving condition, or any other incidental condition known to one of ordinary skill in the art without deviating from the teachings disclosed herein. By way of example and not limitation, an incidental condition may be determined after a repair to the windshield of vehicle 100a. By way of example and not limitation, an incidental condition may be determined after prolonged driving along an especially bumpy or irregular road surface.

In the depicted embodiment, a field calibration may be coordinated by a coordinating server 203. Coordinating server 203 may be in wireless data communication with each of vehicles 100 via a server transceiver 205. In the depicted embodiment, server transceiver 205 comprises a single transceiver operable to transmit and receive data, but other embodiments may comprise configurations having a separate transmitter and receiver without deviating from the teachings disclosed herein. Coordinating server 203 may be operable to transmit data or commands to each of vehicles 100. Coordinating server 203 may be operable to receive data from each of vehicles 100. In embodiments comprising partially-autonomous or non-autonomous vehicles, coordinating server 203 may be operable to provide driving instruction or guidance to a user such as a driver or passenger of a vehicle. Such driving instruction or guidance may be presented to the user via a heads-up display, native display console, or portable device within the vehicle.

In the depicted embodiment, vehicle 100a may report to coordinating server a condition that warrants a calibration of field-adjustable sensor 103a. In response, the coordinating server may identify other vehicles 100 within a predetermined proximity to vehicle 100a to serve as target vehicles.

Once one or more target vehicles have been identified, coordinating server 203 may direct vehicle 100a to measure with field-adjustable sensor 103a the distances between vehicle 100a and the other vehicles 100. In the depicted embodiment, distances may be represented as multi-dimensional vectors to provide sufficient description of the orientation and separation of the vehicles in a 3-dimensional space, but other embodiments may comprise other configurations without deviating from the teachings disclosed herein. In the depicted embodiment, distance β represents the measured distance between field-adjustable sensor 103a and vehicle 100b. Distance γ represents the measured distance between field-adjustable sensor 103a and vehicle 100c. Distance δ represents the measured distance between field-adjustable sensor 103a and vehicle 100d. Coordinating server 203 may then request the location data of each of the vehicles 100, which will be measured using the respective location sensor 105 (see FIG. 1) of each vehicle.

After receiving the distance measurements and location measurements of each of vehicles 100, coordinating server 203 may utilize this data to calculate whether each of the distance measurements is accurate to within a specified tolerance for field-adjustable sensor 103a. The precision of the comparison may further be enhanced by utilizing the awareness of the physical dimensions of each vehicle 100 by its associated vehicle processor 101 (see FIG. 1). In the depicted embodiment, each of measurements β, γ, and δ may be directed to the nearest outer surface of vehicle 100b, vehicle 100c, and vehicle 100d to field-adjustable sensor 103a respectively. An expected distance between vehicle 100a and another of vehicles 100 will therefore comprise a calculated distance between the location field-adjustable sensor 103a and a point upon the corresponding vehicle 100. In the depicted embodiment, the nearest point upon the corresponding vehicle 100 may be used for calculating the distance, but other embodiments may comprise other measurements without deviating from the teachings disclosed herein. In some embodiments, multiple points upon a corresponding vehicle may be utilized to measure distances, and each of the measurements may be utilized in the operation. Because each of vehicles 100 are operable to provide location data describing its own boundary surfaces, the expected distance may be calculated based upon which portion the respective vehicle 100 is intersected by a linear measurement between field-adjustable sensor 103a and the location sensor 105 associated with the particular vehicle.

In the depicted embodiment, expected distances β', γ', and δ' (not shown) may be calculated based upon the data describing the physical dimensions of each vehicle 100. The expected distances may be compared to the measurements β', γ', and δ' respectively. If one or more measurements are determined to be inaccurate beyond a predetermined threshold, coordinating server 203 may signify that field-adjustable sensor 103a warrants calibration. Vehicle processor 101a may then perform the calibration of field-adjustable sensor 103a in response to differences between the measurement data and the expected measurements. The decision to calibrate field-adjustable sensor 103a may be determined in part using a weighted algorithm of the differences. By way of example and not limitation, if it is known that the field-adjustable sensor 103a is more accurate within a particular range of distances, measured distances within that specified range may be considered with greater weight than measured distances outside of that specified range. Other embodiments may utilize different weighting in their decision algorithms without deviating from the teachings disclosed herein.

The depicted embodiment utilizes three target vehicles, but any number of target vehicles may be utilized without deviating from the teachings disclosed herein. In the depicted embodiment, each of vehicles 100 are represented as a single type of vehicle (a sedan), but other embodiments may comprise other types of vehicles to serve as a subject vehicle or target vehicle without deviating from the teachings disclosed herein. For example, a subject vehicle could interact with a plurality of target vehicles of different types without deviating from the teachings disclosed herein. In some embodiments, non-vehicular target objects, such as road signs, road barricades, bridge overpasses, natural objects, or specialized beacons may be utilized instead of, or in addition to, one or more target vehicles without deviating from the teachings disclosed herein.

Figure 3:
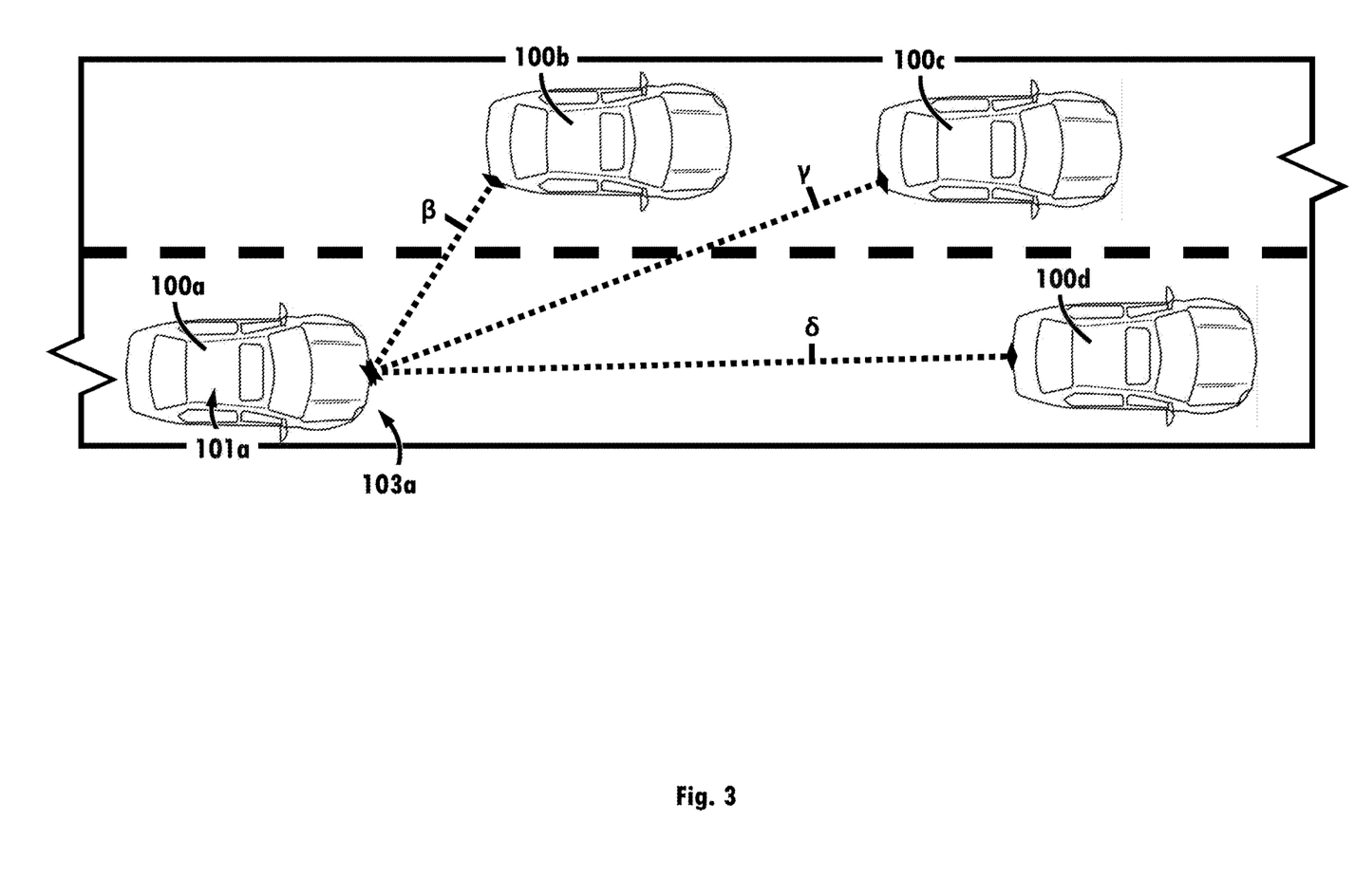
FIG. 3 is a diagrammatic view of a second system operable to perform a field calibration of a vehicle sensor.

Some embodiments may not rely upon a coordinating server for proper operation. FIG. 3 provides a diagrammatic illustration of a system operable to perform a field calibration in substantially the same manner as depicted above with respect to FIG. 2, only relying upon one or more vehicle processors associated with the vehicles to perform the functions associated with a coordinating server. In the depicted embodiment of FIG. 3, vehicle 100a remains a subject vehicle for the calibration, and its associated vehicle processor 101a performs the functions described above associated with the coordinating server of FIG. 2. In such embodiments, the vehicle processor 101 associated with a subject vehicle 100 may be utilized to perform these tasks. In the depicted embodiment of FIG. 3, the subject vehicle is vehicle 101a, but any of the depicted vehicles, or other configurations of vehicles having a vehicle processor, field-adjustable sensor, location sensor, and vehicle transceiver may serve as a subject vehicle for a field calibration without deviating from the teachings disclosed herein.

Figure 4:
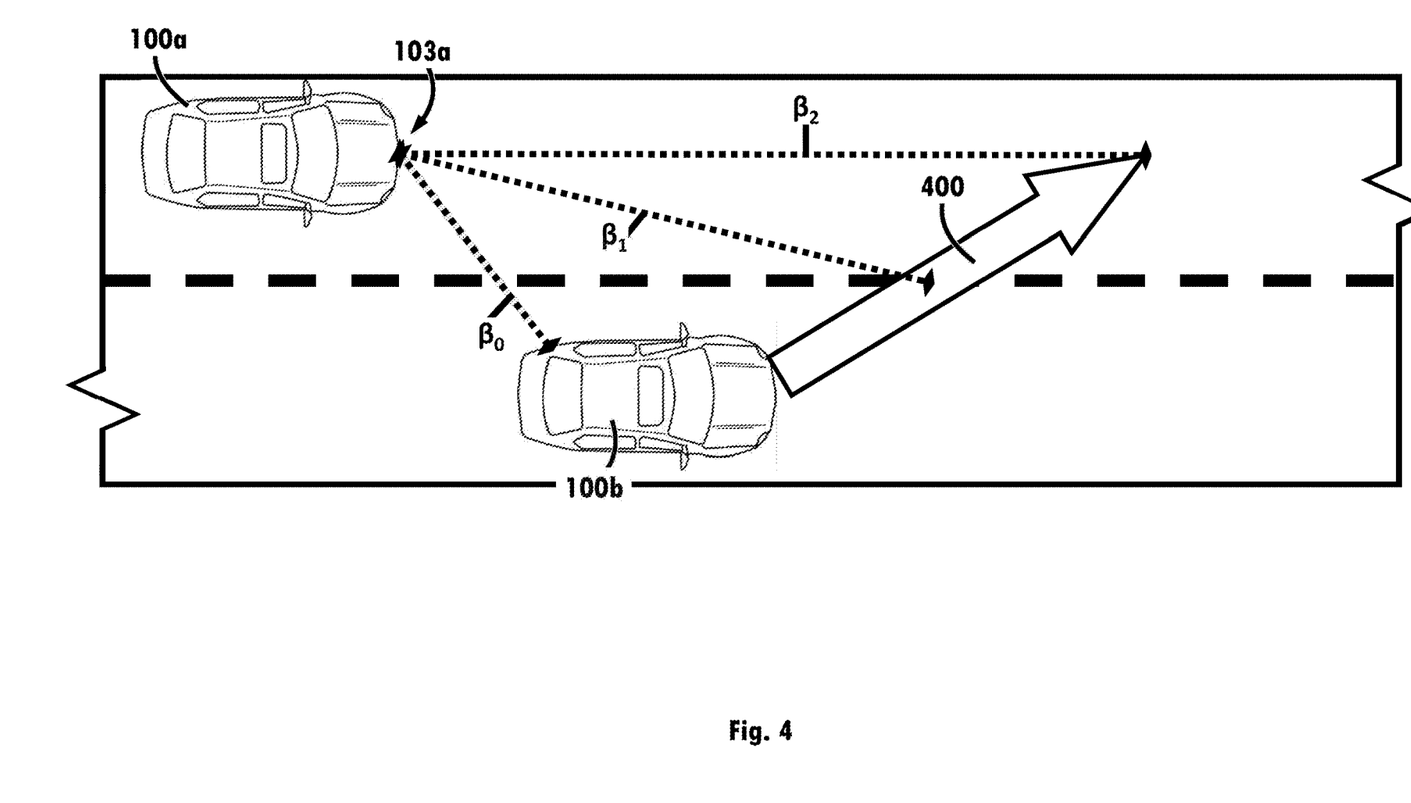
FIG. 4 is a diagrammatic view of a system operable to perform a predetermined maneuver during a field calibration of a vehicle sensor.

A subject vehicle may utilize multiple measurements to a target vehicle in order to provide a greater body of data from which to determine if calibration is warranted. In some embodiments, one or more target vehicles may perform a predetermined maneuver in order to provide a greater body of measurement data, or provide a broader range of measurement data with respect to the relative position of the target vehicle to the subject vehicle. FIG. 4 is a diagrammatic view of a calibration during a predetermined maneuver. In the depicted embodiment, vehicle 100a serves as a subject vehicle, and measures the distance to a target vehicle 100b at three distinct points during a predetermined maneuver. In the depicted embodiment, the predetermined maneuver comprises a lane change for vehicle 100b in a direction 400 along the road, but other embodiments may comprise any predetermined maneuver without deviating from the teachings disclosed herein. By way of example and not limitation, predetermined maneuvers may comprise a target vehicle changing speed with respect to the subject vehicle, adjusting the relative position with respect to the subject vehicle, maintaining relative speed and position with respect to the subject vehicle, or moving to a particular range of the sensor with respect to the subject vehicle. Other embodiments may comprise other types of predetermined maneuvers without deviating from the teachings disclosed herein.

In the depicted embodiment of FIG. 4, vehicle 100a and vehicle 100b may each comprise a fully autonomous, self-driving vehicle, but other embodiments may comprise other configurations without deviating from the teachings disclosed herein. Vehicles comprising partially-autonomous or ADAS functions may be utilized without deviating from the teachings disclosed herein, Non-autonomous vehicles may be utilized and provide instructions or guidance to a driver to properly perform one or more predetermined maneuvers without deviating from the teachings disclosed herein.

During the predetermined maneuver, the subject vehicle may make multiple measurements of the target vehicle to generate multiple sets of corresponding data. In the depicted embodiment, vehicle 100a makes three measurements $\beta_0$, $\beta_1$, and $\beta_2$ as vehicle 100b performs the predetermined maneuver. Each of these three measurements may then be associated with instantaneous location measurements for each of vehicle 100a and vehicle 100b, providing a basis of comparison between expected data and measured data. In the depicted embodiment, vehicle 100a interacts only with vehicle 100b, but a subject vehicle may interact with any number of target vehicles performing a predetermined maneuver without deviating from the teachings disclosed herein. A subject vehicle may interact with a plurality of target vehicles wherein only a portion of the plurality of target vehicles perform a predetermined maneuver without deviating from the teachings disclosed herein.

The above description is directed to an extrinsic calibration, or a calibration directed to external conditions of a subject sensor. In some embodiments, a predetermined maneuver may be utilized to perform an intrinsic calibration of a field-adjustable sensor 103. A field-adjustable sensor 103 may be operable across a range of angles or relative positions with respect to objects within the external environment, and may exhibit intrinsic distortions at some of the angles or relative positions. For example, field-adjustable sensor 103a as depicted in FIG. 4 may exhibit distortions at one or more of the angles associated with measurements $\beta_0$, $\beta_1$, and $\beta_2$. Because the actual shape and size of vehicle 100b is consistent for each of the measurements, the consistency of field-adjustable sensor 103a may be compared between each of the measurements to determine a level of intrinsic calibration.

In the depicted embodiment, the field-adjustable sensor 103a may comprise a proximity sensor, but other embodiments may comprise other sensors without deviating from the teachings disclosed herein. By way of example, and not limitation, other embodiments may comprise a sensor such as a radar sensor, lidar sensor, ultrasonic sensor, microphone, camera, optical sensor, infrared sensor, accelerometer, yawrate sensor, wheel speed sensor, speedometer, a steering angle sensor, or any other sensor known to one of ordinary skill in the art without deviating from the teachings disclosed herein. Each sensor type may utilize a different predetermined maneuver that is appropriate to generate data suitable for determining if a calibration is warranted without deviating from the teachings disclosed herein.

Vehicles may perform predetermined maneuvers for additional reasons than providing multiple data sets for comparison. For example, a predetermined maneuver may result in adjustment of the relative position of a target vehicle such that it is within range of a field-adjustable sensor of the subject vehicle. In one such embodiment, a target vehicle in front of the subject vehicle may maneuver to behind the vehicle in order to provide a target for a rear-facing field-adjustable sensor. In another example, a first target vehicle may utilize a predetermined maneuver after a first measurement in order to avoid obscuring a second target vehicle from the subject vehicle for a second measurement. Other predetermined maneuvers may have other purposes recognized by one of ordinary skill in the art without deviating from the teachings disclosed herein.

Figure 5:
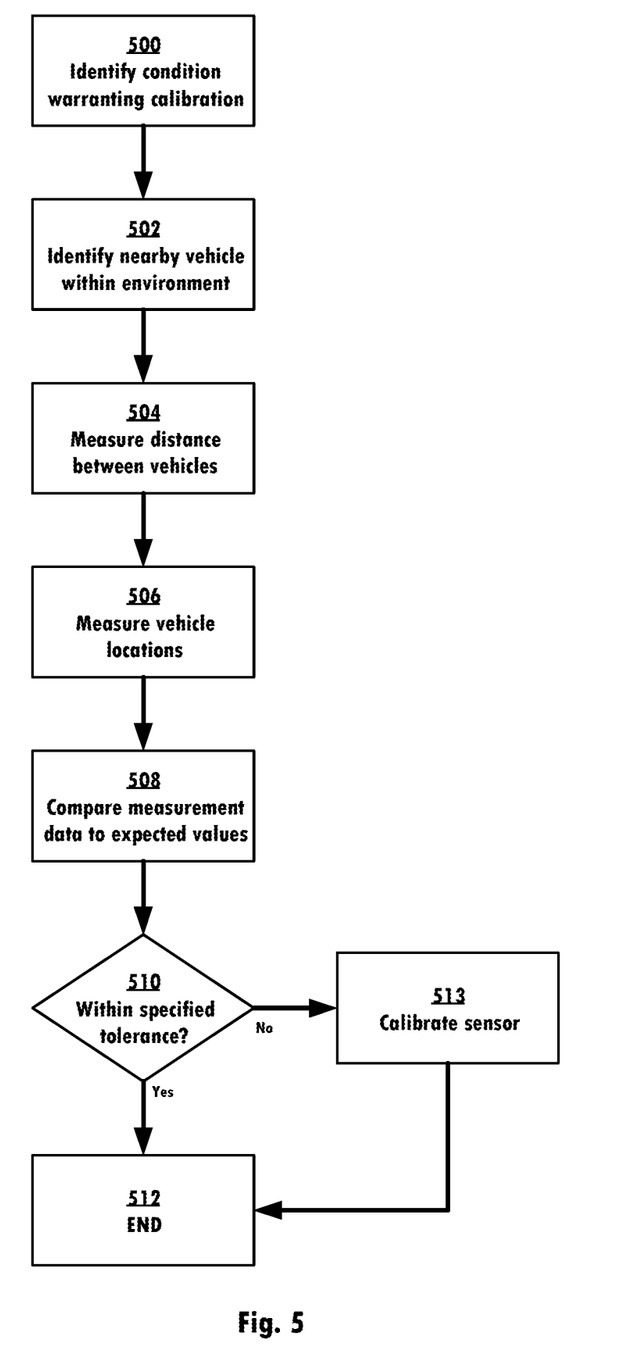
FIG. 5 is a flowchart depicting a method of field calibrating a vehicle sensor.

FIG. 5 is a flowchart illustrating a method of a calibration assessment and calibration of a field-adjustable sensor according to one embodiment of the teachings disclosed herein. The method begins at step 500 where a condition indicating that a calibration may be warranted is identified with respect to the subject vehicle. The condition may be a routine condition or an incidental condition without deviating from the teachings disclosed herein.

Once a condition has been identified, the method proceeds to step 502, wherein one or more other nearby vehicles within the environment are identified to serve as target vehicles. After suitable vehicles are identified, the method continues to step 504, where the field-adjustable sensor generates measurement data with respect to the target vehicles. At step 506, location data indicating the locations of the target vehicles and the subject vehicle are generated using a location sensor. In some embodiments, the locations of the target vehicles may advantageously be measured with respect to particular portions of the vehicle, such as an exterior surface nearest to the subject vehicle. In some embodiments, the location of the subject vehicle's field-adjustable sensor may be measured relative to the location of the location sensor to improve accuracy of the calibration consideration. In some embodiments, steps 504 and 506 may be performed in any order without deviating from the teachings disclosed herein. In some embodiments, steps 504 and 506 may be performed concurrently without deviating from the teachings disclosed herein.

After the measurement data and location data is obtained, the location data is utilized at step 508 to generate expected data reflecting the anticipated results of the measurement data based upon the location data. The expected data may be interpolated or extrapolated mathematically based upon the location data describing each of the subject vehicle and the one or more target vehicles, depending on the type of sensor being considered for possible recalibration. The expected data is compared to the measured data to generate difference data describing the differences.

At step 510, signifier data is generated indicating whether the difference data is within a specified tolerance. The specified tolerance may be determined based upon the specification of the field-adjustable sensor. If the signifier data is within the specified tolerance, then no calibration is necessary, and the method ends at step 512. If the signifier data is not within the specified tolerance, then the method instead proceeds to step 513 to calibrate the field-adjustable sensor before proceeding to step 512 to complete the method. In some embodiments, the specified tolerance may be sufficient to place the field-adjustable sensor in a condition for optimal performance, but other embodiments may comprise other specified tolerances without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A sensor calibration system comprising:
 a subject sensor associated with a subject vehicle and operable to generate measurement data;
 a subject processor associated with the subject vehicle, the subject processor in data communication with the subject sensor and operable to detect a condition of the subject sensor warranting a calibration;

a subject-location field-adjustable sensor in data communication with the subject processor, the subject-location sensor operable to generate subject-location data indicating the location of the subject-location sensor;

a first processor associated with a first target vehicle, the first processor operable for data communication with the subject processor;

a first location sensor in data communication with the first processor, the first location sensor operable to generate first-location data indicating the location of the first location sensor;

a second processor associated with a second target vehicle, the second processor operable for data communication with the first processor; and a second location sensor in data communication with the second processor, the second location sensor operable to generate second-location data indicating the location of the second location sensor, wherein the subject processor is operable to control the subject sensor to generate first-measurement data indicating a distance between the subject sensor and the first target vehicle, wherein the subject processor is operable to generate subject-position data indicating the position of the subject sensor based upon the subject-location data and the first processor is operable to generate first-boundary data indicating positions of exterior surfaces of the first target vehicle based upon the first-location data, wherein the subject processor is further operable to generate first-expected data based upon the subject-position data and the first-boundary data, wherein the second processor is operable to generate second-boundary data indicating positions of exterior surfaces of the second target vehicle based upon the second-location data, wherein the subject processor is operable to control the subject sensor to generate second-measurement data indicating the distance between the subject sensor and the second vehicle, wherein the subject processor is further operable to generate second-expected data based upon the subject-position data and the second-boundary data, and wherein the subject processor is further operable to adjust the calibration settings of the field-adjustable subject sensor when the first measurement data does not conform to the first-expected data within a specified tolerance or the second-measurement data does not conform to the second-expected data within a specified tolerance.

2. The system of claim 1, wherein the first processor is operable to control the first target vehicle to perform a predefined autonomous maneuver during the generation of first-measurement data and the first-expected data.

3. The system of claim 2, wherein the first processor is operable to control the first target vehicle to perform the predefined autonomous maneuver in response to a request generated by the subject processor.

4. The system of claim 3, wherein the first processor is operable to perform an intrinsic calibration of the subject sensor using the data generated by the predefined autonomous maneuver of the first target vehicle.

5. The system of claim 4, wherein the first processor is operable to perform an extrinsic calibration of the subject sensor using the data generated by the predefined autonomous maneuver of the first target vehicle.

6. The system of claim 1, wherein the subject processor is operable to detect a condition of the subject sensor warranting calibration.

7. The system of claim 1, wherein the subject processor is disposed remotely from the subject vehicle, and operable to communicate wirelessly with the subject sensor.

8. The system of claim 1, wherein the signifier data is calculated based upon a weighted-result algorithm.

* * * * *